3,072,660
PRODUCTION OF DIHYDROQUINACRIDONES
Chung C. Chen, Belleville, N.J., assignor to E. I. du Pont de Nemours and Company, Wilmington, Del., a corporation of Delaware
No Drawing. Filed Dec. 24, 1958, Ser. No. 782,626
10 Claims. (Cl. 260—279)

This invention relates to a new process for the manufacture of linear dihydroquinacridones and linear quinacridones.

Linear quinacridones have the following basic structural formula:

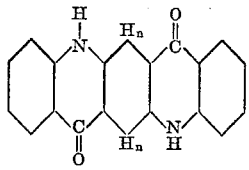

in which the terminal rings may be symmetrically substituted with one or more substituents selected from the group of halogen, alkyl, alkoxy, or a fused aryl ring. When $n$ is 2 in the above formula, such compounds are frequently referred to as dihydroquinacridone compounds and, when $n$ is 1, as quinacridone compounds. Such compounds have been prepared by condensing an arylamine with a dialkyl succinylsuccinate to produce a dialkyl 2,5-diarylamino-3,6-dihydro-terephthalate derivative. This reaction which is disclosed in U.S. Patent 2,821,541 is illustrated by the following equation:

EQUATION 1

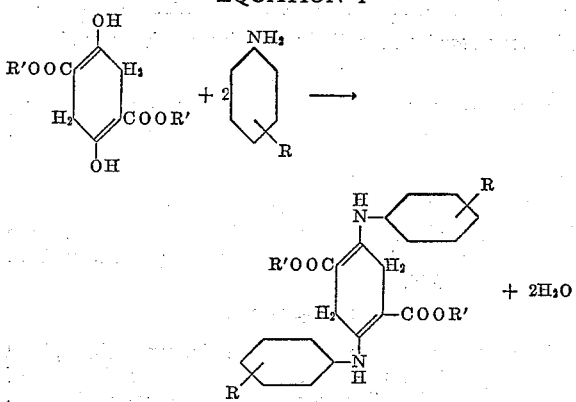

wherein R′ is a lower alkyl group and R may be hydrogen, halogen, alkyl, alkoxy, or a fused aryl ring. The dialkyl 2,5-diarylamino-3,6-dihydro-terephthalate derivative obtained from the above reaction can be converted to the quinacridone structure, more specifically to a dihydroquinacridone, by cyclization in an inert high-boiling liquid. This reaction may be illustrated by the equation below:

EQUATION 2

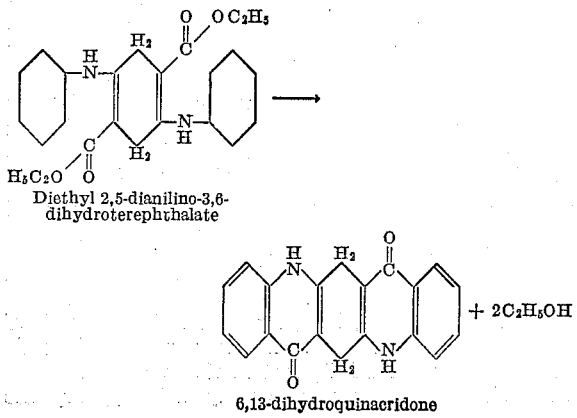

Diethyl 2,5-dianilino-3,6-dihydroterephthalate 6,13-dihydroquinacridone

Specific details of the reaction shown in Equation 2 are found in U.S. Patent 2,821,529.

The present invention has as an object the provision of a new and useful process which combines the reactions shown in Equations 1 and 2 into a single operative step. This is accomplished by prolonged heating of a mixture of at least 2 mols of a diarylamine and 1 mol of a dialkyl succinylsuccinate with a polyphosphoric acid in sufficient quantity to give a fluid mixture at temperatures in the range of 100° C.–150° C. The dihydroquinacridone product of such a reaction may be easily recovered from the polyphosphoric acid; and, if it is desired to convert the dihydroquinacridone to quinacridone, this may be accomplished by oxidizing the recovered dihydro derivative with a mild oxidizing agent. Such an oxidation is disclosed in U.S. Patent 2,821,529.

In the preferred procedure of this invention, 2 mols of aniline is added slowly to about 5 times its weight of polyphosphoric acid (a commercial product which can be purchased, or which can be made by mixing 2 mols of 100° ortho-phosphoric acid and 1 mol phosphorus pentoxide) while keeping the temperature at a maximum of about 60° C. One mol of diethyl succinylsuccinate is then added to the mixture of aniline and polyphosphoric acid, and the charge is held at about 60° C. with stirring for at least one hour. After this, the mixture is heated to about 120° C. and stirred at this temperature for at least one hour. The reaction mixture is then cooled below the boiling point of water, and the equivalent of about 2 parts of water for each part of polyphosphoric acid is added slowly while maintaining the temperature below the boiling point of water. The mixture is then quickly poured into a large volume of ice and water and the precipitate isolated by conventional filtration, and washed and dried to give a dihydroquinacridone end-product. There are numerous modifications which may be made within this preferred procedure, such as the order of adding materials prior to the heating step, the possible use of substituted arylamines, the use of other dialkyl succinylsuccinates, the possible use of catalysts in the condensation step, and variations in the ratio of polyphosphoric acid to other ingredients. Within rather broad limits, these points are not critical to the invention. The following examples will set forth the preferred procedure in more detail and the effect of the possible variables will be discussed thereafter. These examples are merely illustrative of the invention and are not to be construed as being in limitation thereof. Unless otherwise specified, all parts are by weight.

*Example 1*

18 parts of aniline is added slowly to 100 parts of polyphosphoric acid (obtained by mixing 58.3 parts of $P_2O_5$ with 41.7 parts of 85% ortho-phosphoric acid, followed by heating the mixture at 150° C. for 1 hour and thereafter cooling to a maximum of 60° C.), keeping the temperature of the mixture below 60° C. 25 parts of diethyl succinylsuccinate and 0.2 part of aniline hydrochloride are added to the mixture and the charge is heated to 60° C. and stirred at 60° C. for about 4 hours, giving a creamy, light yellowish paste. The charge is then further heated to 120° C. in 1 hour, held at 120° C. for about 2 hours, and finally heated to 140° C. and held at that temperature for about 1 hour. During this heating cycle, the color turned first to a yellowish and then to a reddish brown. After cooling the reaction mixture to about 90° C., the product is precipitated by adding 200 parts of water dropwise, keeping the temperature at 80° C. to 90° C., after which the mixture is poured quickly into a large volume of ice and water and the precipitate is isolated by filtering, washing acid free and drying to give 24.4 parts of a reaction product which is an impure dihydroquinacridone.

24.4 parts of the crude dihydroquinacridone is oxidized to quinacridone by adding to a mixture of 200 parts of methanol, 36 parts of a 50% solution of NaOH in water and 50 parts of water and stirring the mixture for about 20 minutes after which it is further diluted with 72 parts of water, heated to the boil, and stirred under reflux for 15 minutes. At this point, a solution of 30 parts of nitrobenzene-m-sodium sulfonate in 95 parts of water is added and heating under reflux is continued for about 2 hours. During this oxidation step, the originally slightly colored solid turns to a brilliant red and the red precipitate is filtered from the hot slurry, washed alkali free with water, and dried to give 17.2 parts (55% of theory based on diethyl succinylsuccinate) of a red quinacridone exhibiting the X-ray diffraction patterns of gamma phase quinacridone as set forth in more detail in U.S. Patent 2,844,581.

*Example II*

18 parts of aniline was added slowly to 100 parts of polyphosphoric acid maintained at a temperature below 60° C., after which 25 parts of diethyl succinylsuccinate was added. The charge was stirred at 60° C. for about 3 hours (creamy color), then raised to 100° C. in about 30 minutes (turning yellow), held at 100° C. for 1 hour, then heated to 120° C. (yellow) in 15 minutes and held at that temperature for about 1.5 hours. It was then cooled to 90° C., diluted by slowly adding about 300 parts of water, filtered, washed acid free with water and dried to give about 19.5 parts of crude dihydroquinacridone.

To bring about the oxidation to quinacridone, 19.5 parts of crude dihydroquinacridone was added to 160 parts of methanol to which 29 parts of a 50% aqueous solution of sodium hydroxide and 40 parts of water were added and the mixture stirred for 20 minutes at room temperature. 50 parts of water was then added and the mixture was heated to the reflux and, after maintaining at this temperature for about 15 minutes, 22 parts of nitrobenzene-m-sodium sulfonate was added and boiling under reflux was continued for about 2 hours, after which the charge was diluted with a large volume of water, filtered, washed alkali free with water and dried to give 16.4 parts of quinacridone which corresponds to a yield of 53.2% based on the diethyl succinate used.

*Example III*

In this example, a large excess of aniline and a somewhat larger amount of polyphosphoric acid was used. 55 parts of aniline was added slowly with good agitation to 250 parts of polyphosphoric acid and held below 90° C. 25 parts of diethyl succinylsuccinate was then added and the charge was slowly heated to 120° C. and held at this temperature for 2 hours and finally heated further to 150° C. for about 2 hours and then cooled to 90° C. At this point the charge was diluted with 500 parts of water, filtered, washed acid free with water and dried. The resulting 26 parts of crude dihydroquinacridone was oxidized by adding to a mixture of 130 parts of water, 120 parts of methanol, 53 parts of 50% aqueous solution of sodium hydroxide and 26 parts of nitrobenzene-m-sodium sulfonate and stirring at the reflux temperature for about 2 hours. It was then filtered hot, washed with methanol and then with water until alkali free and dried to give 15.5 parts of quinacridone (50.2% of theory based on the diethyl succinylsuccinate used).

*Example IV*

In this example, the aniline was used in the form of the hydrochloride. A mixture of 25 parts of diethyl succinylsuccinate, 30 parts of aniline hydrochloride and 120 parts of polyphosphoric acid was heated with agitation to 80° C. and held between 80° C.–90° C. for about 4 hours until the evolution of HCl ceased. It was then heated to 120° C. and held at that temperature for 2 hours, cooled to 90° C., diluted with 300 parts of water, filtered, washed acid free with water and dried to give 20 parts of crude dihydroquinacridone. This dihydroquinacridone was oxidized following the oxidation procedure of Example II to give 14 parts of quinacridone (45.5% of theory based on diethyl succinylsuccinate).

*Example V*

26 parts of o-chloraniline was added slowly to 100 parts of polyphosphoric acid at 60° C. followed by the addition of 25 parts of diethyl succinylsuccinate. The charge was stirred at 60° C. for about 2 hours (creamy light yellow color) and was then heated to 80° C. in 20 minutes (turning into a clear yellow color). After holding at 80° C. for 1 hour, it was heated to 100° C., and held for 1 hour, and then to 120° C. and held for another hour (becoming orange in color). It was then cooled to 80° C., diluted with 300 parts of water, filtered, washed acid free with water and dried to give 38 parts of crude 4,11-dichloro-6,13-dihydroquinacridone.

10 parts of the crude dichloro-dihydroquinacridone was added to 120 parts of methanol together with a solution of 40 parts of potassium hydroxide in 48 parts of water and 10 parts of nitrobenzene-m-sodium sulfonate. The mixture was then heated to the boil and maintained under refluxing conditions for 3 hours, drowned into 600 parts of water, filtered, and washed with water. It was then added to 100 parts of glacial acetic acid and heated to the boil and stirred under reflux for about 1 hour after which it was filtered hot and the filter cake was then added to 100 parts of dimethyl formamide, heated to the boil and maintained under reflux for about 3 hours, filtered hot, washed with water until acid free and dried. 4.4 parts of 4,11-dichloroquinacridone was obtained, corresponding to 45% of theory based on the diethyl succinylsuccinate used.

*Example VI*

This example is substantially identical with that of the process of Example V except that 35 parts of o-bromoaniline was used instead of 26 parts of o-chloraniline to give about a 40% yield of 4,11-dibromoquinacridone. The identity of this product was confirmed by comparing its infra-red absorption curve with a curve of a sample prepared from o-bromaniline after the process of U.S. Patent 2,821,529.

*Example VII*

The process of Example II was followed throughout except that 22 parts of p-fluoroaniline was used in place of the 18 parts of aniline to give about 15 parts of 2,9-difluoroquinacridone as the final product corresponding to about 45% yield based on the diethyl succinylsuccinate used.

The term "polyphosphoric acid" has been widely used to refer to any phosphoric acid which contains phosphorus pentoxide ($P_2O_5$) in excess of that required to form orthophosphoric acid ($H_3PO_4$). Such mixtures are quite analogous to "fuming sulfuric acid" and in a like manner may be obtained with a rather wide range of variation in proportions. However, studies of such mixtures have led to the conclusion that they comprise one or more of three compounds in admixture. Orthophosphoric acid ($H_3PO_4$) may be looked upon as a compound of water and $P_2O_5$ in the molar ratio of three to one and having a $P_2O_5$ content of 72.4%. The recognized compounds containing excess $P_2O_5$ include pyrophosphoric acid with a water/$P_2O_5$ ratio of two to one and having a $P_2O_5$ content of 79.8%, tripolyphosphoric acid with the water/$P_2O_5$ ratio of five to three and a $P_2O_5$ content of 82.6% and, finally, metaphosphoric acid with the water/$P_2O_5$ ratio of one to one and a $P_2O_5$ content of 88.7%. A mixture obtained by adding 1 mol of $P_2O_5$ to 2 mols of ortho-phosphoric acid, thus having a water/$P_2O_5$ ratio of three to two and a $P_2O_5$ content of between about 82% and 84%, is available commercially as "polyphosphoric acid." Therefore, in accordance with the terminology used in the art, the expression "a polyphosphoric acid" as used in the claims refers to any phosphoric acid having a $P_2O_5$ content in excess of that found in ortho-phosphoric acid and more specifically containing not more than about 2 mols of water per mol of $P_2O_5$. This corresponds to a $P_2O_5$ content of 80% or more. The preferred material is the acid obtained by mixing 1 mol of $P_2O_5$ with 2 mols of ortho-phosphoric acid.

In the first condensation step, i.e., the condensation of the dialkyl succinylsuccinate with an arylamine, it is within the knowledge of the art that the reaction is promoted by acid catalysis. In Example I a small amount of aniline hydrochloride is used, and in Example IV all of the aniline is used in the form of its hydrochloride. However, in Example II, in which there is no aniline hydrochloride, a substantially equivalent yield is obtained; thus, it appears that the polyphosphoric acid may function in this first reaction both as a heat transfer medium and as the acidic catalyst to provide the condensation. Likewise, in the cyclization step it appears that polyphosphoric acid is a powerful ring closing agent but, for the most effective carrying out of this reaction, it appears that it must be present in sufficient amount to maintain the reaction mixture in a fluid state so that its properties as a heat transfer liquid are very important to the overall process. To meet these conditions, it appears that from about 2 to about 3 parts of polyphosphoric acid is necessary for each part of diethyl succinylsuccinate added in the reaction to maintain satisfactory fluidity and result in acceptable yields. Somewhat higher amounts of polyphosphoric acid up to about 4 to 6 parts per part of diethyl succinylsuccinate appear to give slightly improved yields and to be preferred. Additional amounts up to the range of 8 to 10 parts of polyphosphoric acid per part of diethyl succinylsuccinate may offer operating advantages but become increasingly uneconomical as the amount is increased without significant increases in yield. The upper limit on the amount of polyphosphoric acid is not critical. However, from a practical viewpoint, the ratio of polyphosphoric acid to reactants should not be so high as to prevent the reactants from contacting and reacting. It is believed that such practical limitations are readily recognized by anyone skilled in the art.

The temperatures used to effect the reaction of this invention are usually above about 80° C. and below the decomposition temperature of the quinacridone product and preferably range up to about 150° C. Reaction appears to begin in the range of 80° C. to 100° C. and to attain substantial completion at a temperature of about 120° C. on prolonged heating. However, additional heating up to about 140° C.–150° C. may be desirable in some cases to increase the rate of reaction and the yields. In view of the above facts, the preferred temperature range appears to be from about 100° C.–120° C.

The optimum time of heating at the reaction temperature will, of course, vary with the temperature employed and with the rate at which the mixture is heated up after the ingredients have been added. The optimum heating cycle for any given set of conditions is readily determined by experiment, but generally speaking, heating periods in the range of 2 to 4 hours at reaction temperature seem to be preferred to obtain maximum yields. The heating may be conducted in a stepwise manner as described in the preferred embodiment of the invention. However, it is not necessary to follow this procedure, provided the rate of heating is not so rapid as to cause decomposition. The existence of some of the end-product in the reaction mixture may be perceived by a color change as the reaction proceeds. For example, when the starting arylamine is aniline, the mixture takes on a yellow or reddish yellow color as the dihydroquinacridone is produced.

The examples in this case have shown the use of diethyl succinylsuccinate as a starting material. However, the dimethyl, dipropyl, and other lower alkyl succinylsuccinates can be used with equal facility in the reaction, the choice being solely a matter of availability. Generally speaking, esters of this sort prepared from either methyl or ethyl alcohol are more readily available and lower in cost than those prepared from the higher alcohols. For this reason, the methyl and ethyl esters are the preferred materials but the esters of the higher alcohols also function in the reaction and are considered to be within the scope of the invention. It is, of course, realized that as the length of the carbon chain in the alcohol portion of the ester is increased the boiling point of the by-product alcohol is higher and its miscibility with water is lower, thus making its removal from the reaction mixture somewhat more difficult.

The examples in this specification have shown the use of aniline as the arylamine with the resulting quinacridone being an unsubstituted linear quinacridone. It has also been shown in the examples that substituted aniline derivatives can be used in the reaction with equal facility. In fact, this invention provides a highly desirable method for preparing symmetrically substituted quinacridones. For instance, the use of ortho-chloroaniline results in the ultimate formation of 4,11-di-chloroquinacridone. In a similar manner, other ortho substituted anilines, such as ortho-bromaniline, ortho-fluoroaniline, ortho-toluidine, ortho-anisidine, and the like, result in the corresponding 4,11-disubstituted quinacridones, while para-substituted anilines result in the corresponding 2,9-disubstituted quinacridones. Also, either alpha naphthylamine or beta naphthylamine can be used in the reaction with the formation of the corresponding dibenzoquinacridones.

One of the advantages of this invention over the prior art is that it eliminates the necessity of effecting the reaction in the presence of a large excess of arylamine. In the prior art process large amounts of amine appeared to be desirable to promote solubility, particularly solubility of the aniline hydrochloride catalyst. However, in this invention the amount of arylamine used is not critical since substantially all of the materials are soluble in the acid. From a practical standpoint, there should be enough arylamine to react with the dialkyl succinate (i.e., at least 2 mols of arylamine per mol of succinate), but lesser amounts may be used if so desired. Excess amine can also be used as shown in Example III.

The process of this invention offers several potential advantages over prior art processes for the manufacture of quinacridone pigments. In particular, the elimination of the separate step of condensation of the arylamine with the dialkyl succinylsuccinate is a significant advantage and coupled with this is the elimination of the necessity for using a large excess of the arylamine. An additional advantage is that the reactions are carried out in a water-miscible medium, and as a result of this, it is much easier and more convenient to isolate and purify the end-product. Another advantage resulting from the use of the water-miscible liquid is the elimination of the safety hazards connected with the use of organic liquids and also the difficulty of removing all traces of such liquids from the final product.

Still another advantage in the process of this invention is that the condensation and cyclization reactions can be carried out using substituted arylamines. Such substituted amines are relatively high boiling, and in prior art processes which use excess amine and a high boiling organic liquid reaction medium, there is a problem of subsequently recovering the unused amine from the reaction medium. The method of operation and the reaction medium used in this invention eliminate such a problem.

Since it is obvious that many changes and modifications can be made in the above-described details without departing from the nature and spirit of the invention, it is to be understood that the invention is not to be limited to said details except as set forth in the appended claims.

I claim:

1. A process for preparing a dihydroquinacridone compound comprising heating, in a fluid reaction medium consisting essentially of a polyphosphoric acid, a lower dialkyl succinylsuccinate with an arylamine selected from the group consisting of aniline, alpha-naphthylamine, beta-naphthylamine, and substituted anilines and naphthylamines which have at least one unsubstituted carbon ortho to the amino group and wherein the substituents are from the group consisting of halogen, lower alkyl, and lower alkoxy groups, said heating being conducted at temperatures above about 80° C. and below the decomposition temperature of the dihydroquinacridone compound being produced by said heating.

2. The process of claim 1 in which the dialkyl succinylsuccinate is diethyl succinylsuccinate.

3. The process of claim 1 in which the dialkyl succinylsuccinate is dimethyl succinylsuccinate.

4. The process of claim 1 in which the arylamine is aniline.

5. The process of claim 1 in which the arylamine is orthochloroaniline.

6. The process of claim 1 in which the arylamine is parafluoroaniline.

7. A process for preparing a dihydroquinacridone compound comprising heating, in a fluid reaction medium consisting essentially of a polyphosphoric acid, a lower dialkyl succinylsuccinate, and an arylamine selected from the group consisting of aniline, alpha-naphthylamine, beta-naphthylamine, and substituted anilines and naphthylamines which have at least one unsubstituted carbon ortho to the amino group and wherein the substituents are from the group consisting of halogen, lower alkyl, and lower alkoxy groups, said heating being conducted for from 1–3 hours at a temperature of 80° C. to 150° C.

8. The process of claim 7 in which the polyphosphoric acid has a $P_2O_5$ content of 82%–84%.

9. The process of claim 7 in which the polyphosphoric acid has a $P_2O_5$ content of at least 80%.

10. The process of claim 8 in which the dialkyl succinylsuccinate is diethyl succinylsuccinate and the arylamine is aniline.

References Cited in the file of this patent

UNITED STATES PATENTS

| | | |
|---|---|---|
| 2,821,529 | Struve | Jan. 28, 1958 |
| 2,821,530 | Struve | Jan. 28, 1958 |

OTHER REFERENCES

Gilman et al.: J. Amer. Chem. Soc., vol. 47, pp. 245–246 (1925).

Liebermann: Liebigs Annalen, vol. 518, pages 245–250 (1935).

Uhlig: Angewante Chem., vol. 66 (1954), pp. 435–6.

Hein et al.: J. Amer. Chem. Soc., vol. 79, pp. 427–429 (1957).